United States Patent
Choi et al.

(10) Patent No.: US 11,608,164 B2
(45) Date of Patent: Mar. 21, 2023

(54) TILTING SYSTEM FOR PROPELLER OF AERIAL VEHICLE

(71) Applicants: Hyundai Motor Company, Seoul (KR); Kia Corporation, Seoul (KR)

(72) Inventors: Jae Young Choi, Seongnam-si (KR); Sang Hyun Jung, Hwaseong-si (KR); Chung Sik Yim, Anyang-si (KR); Kyu Hoon Cho, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/411,962

(22) Filed: Aug. 25, 2021

(65) Prior Publication Data

US 2022/0194572 A1 Jun. 23, 2022

(30) Foreign Application Priority Data

Dec. 21, 2020 (KR) .......................... 10-2020-0179655

(51) Int. Cl.
*B64C 27/52* (2006.01)

(52) U.S. Cl.
CPC .................................... *B64C 27/52* (2013.01)

(58) Field of Classification Search
CPC ................................. B64C 27/28; B64C 27/52
See application file for complete search history.

(56) References Cited

U.S. PATENT DOCUMENTS

| 4,720,059 A | * | 1/1988 | Stearns, Jr. | ............. B64C 27/52 244/17.11 |
| 2020/0148347 A1 | * | 5/2020 | Bevirt | ..................... B64C 11/46 |

FOREIGN PATENT DOCUMENTS

| CN | 108910030 A | * 11/2018 | ............. B64C 27/28 |
| KR | 10-2020-0067901 A | 6/2020 | |

* cited by examiner

*Primary Examiner* — Richard A Edgar
(74) *Attorney, Agent, or Firm* — Morgan, Lewis & Bockius LLP

(57) ABSTRACT

A tilting system for a propeller of an aerial vehicle, may include a propeller provided in front of the opening portion of the housing and configured to be selectively tilted with respect to the housing; a link assembly provided in the internal space of the housing, a first end portion of which is connected to the housing and a second end portion of which is connected to the propeller, and configured to tilt up or tilt down the propeller as the link assembly is extended from the housing or retracted into the housing; and an actuator coupled to the link assembly and configured to provide power for extension or retraction to the link assembly.

12 Claims, 3 Drawing Sheets

TILTING SYSTEM FOR PROPELLER OF AERIAL VEHICLE

CROSS REFERENCE TO RELATED APPLICATION

The present application claims priority to Korean Patent Application No. 10-2020-0179655 filed on Dec. 21, 2020, the entire contents of which is incorporated herein for all purposes by this reference.

BACKGROUND OF THE INVENTION

Field of the Invention

The present invention relates to a tilting system for a propeller of an aerial vehicle, wherein the propeller not only can make a tilting operation around a single axis, but also can make forward/rearward movements while tilting, suppressing reduction in lifting thrust by a wing or a boom, and maintaining rigidity by use of a single actuator as in a conventional system.

DESCRIPTION OF RELATED ART

An aerial vehicle performs lifting and cruising during a flight. It is therefore customary to provide a lifting propeller and a cruising propeller for a lifting movement and a cruising movement, respectively.

However, the lifting propeller is not used when cruising, and the existence of the lifting propeller is rather a disadvantage in terms of aerodynamic performance.

Therefore, there has been extensive development of tilting propellers such that a single propeller can be tilted up or tilted down according to the environment in which the same is used, satisfying both purposes.

However, a conventional tilting propeller has a problem in that, since the same can tilt at a fixed location only, the wing or boom, on which the propeller is installed, is positioned immediately below the propeller when tilting up, and the underlying wing or boom degrades the thrust during lifting.

Therefore, there is a demand for a technology capable of implementing a propeller which not only can perform simple tilting through a single actuator, but also can slide forwards when tilting up, preventing reduction in thrust during lifting.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a tilting system for a propeller of an aerial vehicle, wherein the propeller not only can make a tilting operation around a single axis, but also can make forward/rearward movements while tilting, suppressing reduction in lifting thrust by a wing or a boom, and maintaining rigidity by use of a single actuator as in a conventional system.

A tilting system for a propeller of an aerial vehicle according to various aspects of the present invention includes: a housing having an internal space and having an opening portion at an end portion of the housing; a propeller provided in front of the opening portion of the housing and configured to be selectively tilted with respect to the housing; a link assembly provided in the internal space of the housing, a first end portion of which is connected to the housing and a second end portion of which is connected to the propeller, and configured to tilt up or tilt down the propeller as the link assembly is extended from the housing or retracted into the housing; and an actuator coupled to the link assembly and configured to provide power for extension or retraction to the link assembly.

The housing may be a boom or a wing of the aerial vehicle.

The propeller may lift the aerial vehicle when being tilted upwards and may cruise the aerial vehicle when being tilted downwards.

The propeller may close the opening portion of the housing when being tilted downwards.

The propeller may open the opening portion of the housing when being tilted upwards and is disposed perpendicularly to a direction in which the housing extends.

The link assembly may be received in the interior of the housing when the propeller is tilted downwards, and may be partially externally exposed through the opening portion when the propeller is tilted upwards.

The link assembly may include an upper link and a lower link, and may be configured such that a length of the lower link is greater than a length of the upper link, and the lower link may include a plurality of parts connected with respect to a hinge.

The actuator may move the upper link and the lower link forwards or rearwards, the upper link and the lower link may be moved forwards together when the propeller is tilted up, the lower link may continue to be moved forwards after the upper link is completely moved forwards, and the plurality of parts of the lower link may be bent with respect to the hinge to lift the propeller to tilt up the propeller.

The actuator may move the upper link and the lower link forwards or rearwards, the propeller may be tilted downwards, the lower link may be moved rearwards, and the plurality of bent portions may be arranged linearly as the upper link and the lower link are moved rearwards when the propeller is tilted downwards.

The forward movement of the upper link may be restricted by a stopper of the housing at a maximum forward movement point, and the actuator may be connected to the lower link.

The lower link may be disposed with a cylinder, and the plurality of parts of the lower link may be moved rearwards into the cylinder or moved forwards to the outside of the cylinder.

The propeller may close the opening portion of the housing when being tilted downwards, and may be rotated upwards while being moved forwards from the opening portion of the housing when being tilted upwards.

A tilting system for a propeller of an aerial vehicle according to various exemplary embodiments of the present invention is advantageous in that the propeller not only can make a tilting operation around a single axis, but also can make forward/rearward movements while tilting, suppressing reduction in lifting thrust by a wing or a boom, and maintaining rigidity by use of a single actuator as in a conventional system.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
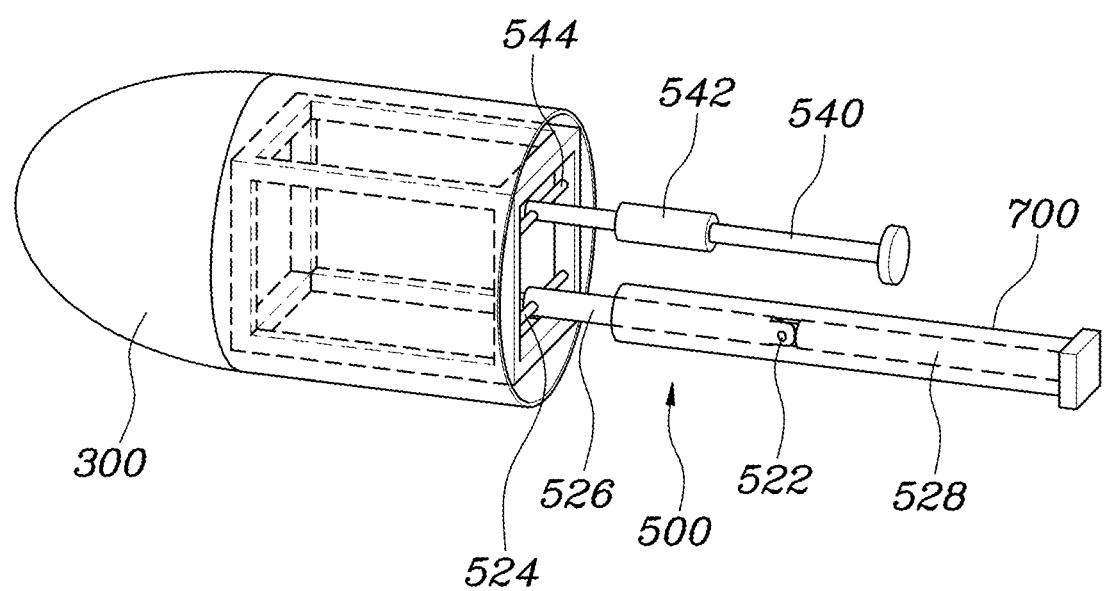
FIG. 1 is a perspective view of a tilting system for a propeller of an aerial vehicle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

Figure 2:
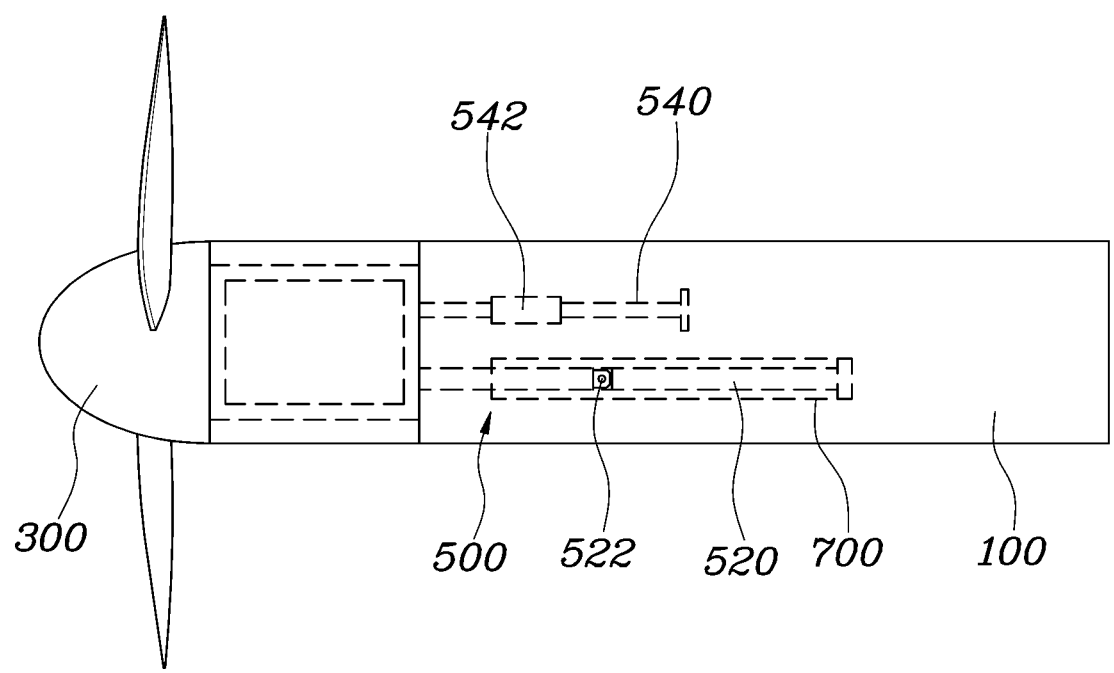
FIG. 2, FIG. 3 and FIG. 4 are views exemplarily illustrating a process of tilting up a propeller by the tilting system for a propeller of an aerial vehicle according to the exemplary embodiment of the present invention.
Figure 3:
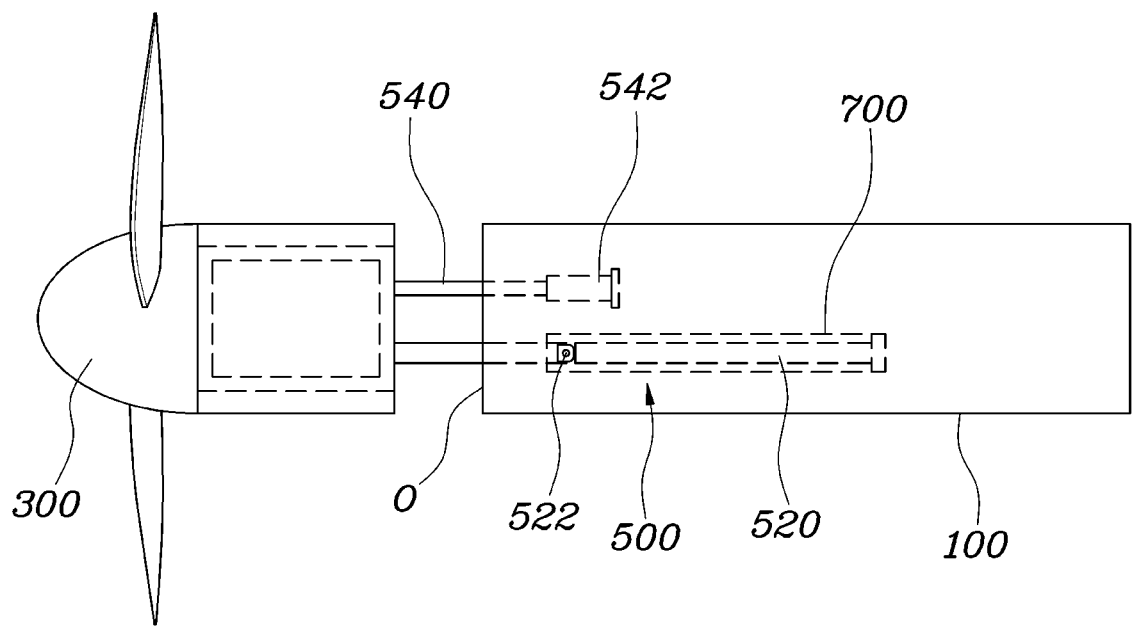
Figure 4:
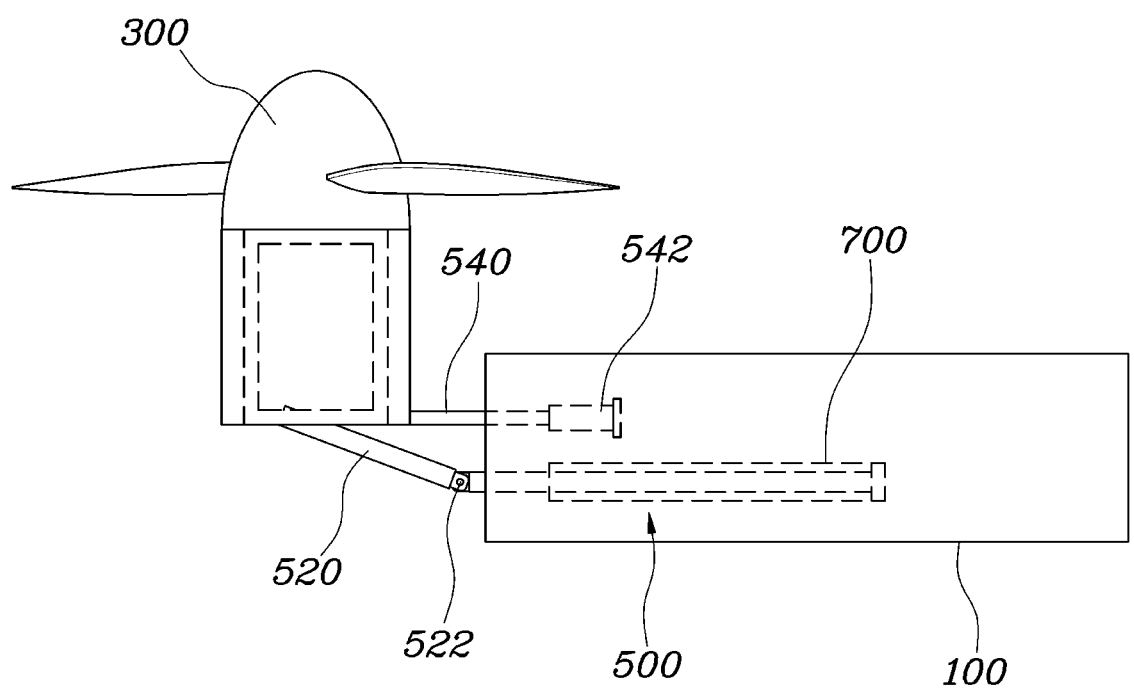
Figure 5:
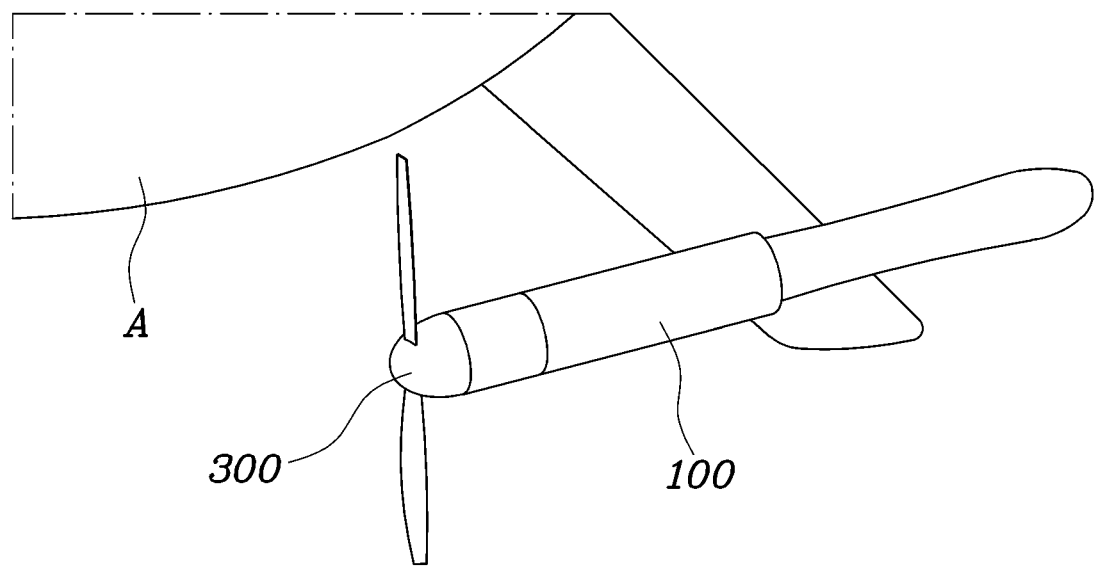
FIG. 5 and FIG. 6 are views exemplarily illustrating an operation of the tilting system for a propeller of an aerial vehicle according to the exemplary embodiment of the present invention.
Figure 6:
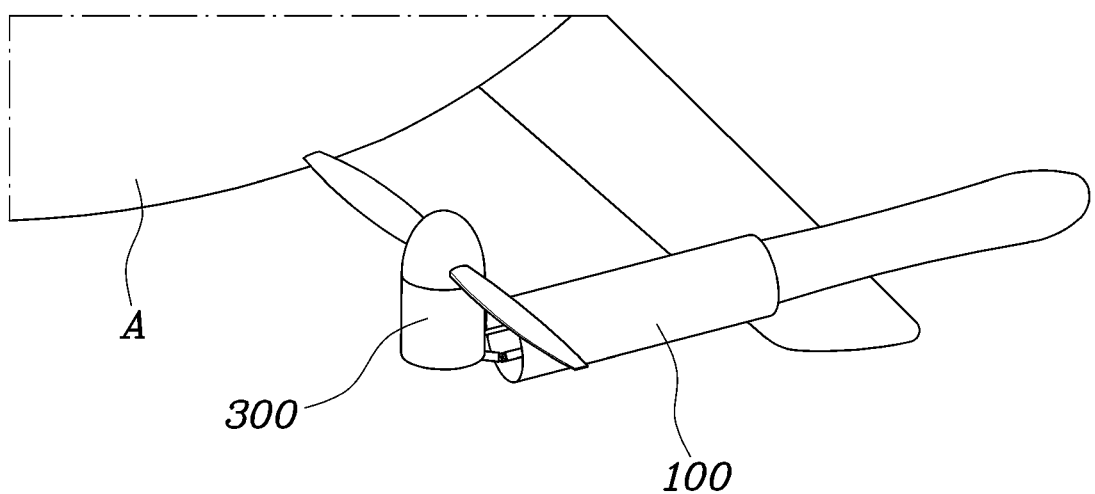

FIG. 1 is a perspective view of a tilting system for a propeller of an aerial vehicle according to various exemplary embodiments of the present invention. FIG. 2, FIG. 3 and FIG. 4 are views exemplarily illustrating a process of tilting up a propeller by the tilting system for a propeller of an aerial vehicle according to the exemplary embodiment of the present invention. FIG. 5 and FIG. 6 are views exemplarily illustrating an operation of the tilting system for a propeller of an aerial vehicle according to the exemplary embodiment of the present invention.

FIG. 1 is a perspective view of a tilting system for a propeller of an aerial vehicle according to various exemplary embodiments of the present invention, and the tilting system for a propeller of an aerial vehicle according to various exemplary embodiments of the present invention includes: a housing 100 having an internal space and having an opening portion at an end portion thereof; a propeller 300 provided in the opening portion O of the housing 100 and configured to be tilted with respect to the housing 100; a link assembly 500 provided in the internal space of the housing 100, one end portion of which is connected to the housing 100 and an opposite end portion of which is connected to the propeller 300, and configured to tilt up or tilt down the propeller 300 as the link assembly 500 is extended or retracted; and an actuator 700 configured to provide power for extension or retraction to the link assembly 500.

According to various exemplary embodiments of the present invention, the loss of the thrust by a wing or a boom located on the lower side may be minimized by not only rotating the propeller 300 but also further moving the propeller 300 forwards when the propeller 300 is tilted down and tilted upwards.

To achieve this, the boom or wing, in which the propeller 300 is provided, is defined as the housing 100. The internal space is formed in the housing 100, and the opening portion O is formed at an end portion of the housing 100. The propeller 300 is provided in the opening portion O of the housing 100, and may be tilted with respect to the housing 100.

In detail, the tilting operation of the propeller 300 is realized by the link assembly 500. The link assembly 500 is provided in the internal space of the housing 100, one end portion of the link assembly 500 is connected to the housing 100 and an opposite end portion of the link assembly 500 is connected to the propeller 300, and the link assembly 500 tilts up or tilts down the propeller 300 as the link assembly 500 is extended or retracted.

The actuator 700 provides power for extension or retraction to the link assembly 500.

That is, the housing 100 may be the boom or the wing of the aerial vehicle. The propeller 300 may lift the aerial vehicle A when being tilted upwards and may cruise the aerial vehicle A when being tilted downwards. Accordingly, the propeller 300 is tilted upwards to face the upper side as in FIG. 4 at a time point at which it is necessary to lift the aerial vehicle A, and is tilted down to face the front side as in FIG. 2 when it is necessary to cruise the aerial vehicle A.

The propeller 300 may close the opening portion O of the housing 100 when being tilted downwards. Accordingly, the loss of the thrust for cruising may be reduced and the aerodynamic performance of the aerial vehicle A may be improved by closing the interior of the housing 100 when the aerial vehicle A is cruised as in the state of FIG. 6.

Meanwhile, the propeller 300 may open the opening portion O of the housing 100 when being tilted up, and may be disposed perpendicularly to a direction, in which the housing 100 extends. Accordingly, as in FIGS. 4 and 6, the propeller 300 may face the upper side and the aerial vehicle A may take off or land vertically. In the instant case, it is inevitable to open the opening portion O of the housing 100, but even if so, there is no big problem because the forward thrust is not necessary.

Meanwhile, the link assembly 500 is received in the interior of the housing 100 when the propeller 300 is tilted downwards, and may be partially externally exposed through the opening portion O when the propeller 300 is tilted upwards.

In detail, the link assembly 500 may include an upper link 540 and a lower link 520, and may be configured such that the length of the lower link 520 is greater than the length of the upper link 540, and the lower link 520 may include a plurality of parts connected with respect to a hinge 522.

Here, the actuator 700 may move the upper link 540 and the lower link 520 forwards or rearwards, the upper link 540 and the lower link 520 may be moved forwards together when the propeller 300 is tilted up, the lower link 520 may continue to be moved forwards after the upper link 540 is completely moved forwards, and the plurality of parts of the lower link 520 may be bent with respect to the hinge 522 to lift the propeller 300 to tilt up the propeller 300.

Furthermore, the actuator 700 may move the upper link 540 and the lower link 520 forwards or rearwards, the propeller 300 may be tilted downwards, the lower link 520 may be moved rearwards, and the plurality of bent portions may be arranged linearly as the upper link 540 and the lower link 520 are moved rearwards when the propeller 300 is tilted downwards.

In detail, the forward movement of the upper link 540 may be restricted by a stopper 542 of the housing 100 at a maximum forward movement point, and the actuator 700 may be connected to the lower link 520. Furthermore, the lower link 520 may be provided with a cylinder, and the plurality of parts of the lower link 520 may be moved rearwards into the cylinder or may be moved forwards to the outside of the cylinder.

Meanwhile, the propeller 300 may close the opening portion O of the housing 100 when being tilted downwards, and may be rotated upwards while being moved forwards from the opening portion O of the housing 100 when being tilted upwards.

FIG. 2 is a view exemplarily illustrating that the propeller 300 is tilted down and is disposed in a cruising state, and FIG. 4 is a view exemplarily illustrating that the propeller 300 is tilted upwards and is in a lifting state, and FIG. 3 is a view exemplarily illustrating an intermediate process. Accordingly, the propeller 300 is operated in the sequence of FIG. 2, FIG. 3, and FIG. 4 when being tilted up, and is changed in the sequence of FIGS. 4, 3, and 2 when being tilted downwards.

In detail, the link assembly 500 includes two links. One of the two links is an upper link 540 disposed on the upper side and the other of the two links is a lower link 520 disposed on the lower side thereof. Here, the length of the lower link 520 is set to be slightly longer because a change of 90 degrees upwards is necessary during a tilting operation.

In an exemplary embodiment of the present invention, a front end portion of the lower link 520 is pivotally connected to the propeller 300 via a hinge 524 and a front end portion of the upper link 540 is pivotally connected to the propeller 300 via a hinge 544 and a rear end portion of the upper link 540 is slidably connected to the housing 100.

In an exemplary embodiment of the present invention, the plurality of parts may include at least two links connected to the actuator 700 and the propeller via the hinge 522, wherein one of at least two links is a link 526 connected to the propeller 300 via the hinge 524 and a link 528 pivotally connected to the link 526 via the hinge 522 and slidably engaged to the actuator 700.

Furthermore, for the tilting-up operation, the lower link 520 includes a plurality of parts divided with respect to the hinge 522.

First, in the state of FIG. 2, the cylinder type actuator 700 is operated. The actuator 700 is of an electric motor driven type or a hydraulic type and moves the lower link 520 in the interior thereof forwards and rearwards. The lower link 520 is moved linearly when being moved forwards by the actuator, and thus the upper link 540 also is moved forwards.

Furthermore, the upper link 540 is stopped by a stopper 542 of the housing 100 at the maximum forward movement distance and cannot be moved forwards any more as in FIG. 3. Through the process, the propeller 300 reaches a location which is spaced forwards apart from the opening portion O of the housing 100, and is tilted upwards at the corresponding point, and thus the loss of the thrust by the boom or the wing is minimized during lifting.

When the actuator 700 continues to be operated, as in FIG. 4, the forward movements of the upper link 540 are restricted, and thus the portions of the lower link 520 are articulated and bent, and accordingly, a tilting-up operation of viewing the upper side by the propeller 300 is performed.

In the present way, because the propeller 300 is tilted after being moved forwards, the loss of the thrust is reduced, and the weight and the manufacturing costs of the aerial vehicle are reduced as both of the forward movement and the rotation of the aerial vehicle are realized through one actuator 700.

Furthermore, because the upper link 540 and the lower link 520 support the propeller 300, the support force of the propeller 300 is increased so that stable flight may be achieved when the propeller 300 is lifted.

FIG. 5 illustrates a state in which the aerial vehicle A corresponding to the exemplary embodiment of the present invention is cruised as the propeller 300 is tilted downwards, and FIG. 6 illustrates a state in which the aerial vehicle A is lifted as the propeller 300 is tilted upwards.

According to the tilting system for a propeller of an aerial vehicle of the present invention, the propeller not only can make a tilting operation around a single axis, but also can make forward/rearward movements while tilting, suppressing reduction in lifting thrust by a wing or a boom, and maintaining rigidity by use of a single actuator as in a conventional system.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tilting system for a propeller of an aerial vehicle, the tilting system comprising:
   a housing having an internal space and having an opening portion at an end portion of the housing;
   a propeller provided in front of the opening portion of the housing and configured to be selectively tilted with respect to the housing;

a link assembly, wherein a first end portion of the link assembly is coupled to the housing and a second end portion of the link assembly is coupled to the propeller, and configured to tilt up or tilt down the propeller as the link assembly is extended from the housing or retracted into the housing; and an actuator coupled to the link assembly and configured to provide power for extension or retraction to the link assembly, wherein the link assembly includes an upper link and a lower link, a length of the lower link is greater than a length of the upper link, and the lower link includes at least a part connected to a hinge connected to the actuator, and wherein the lower link is provided with a cylinder, and the at least a part of the lower link is moved rearwards into the cylinder or is moved forwards to an outside of the cylinder.

2. The tilting system of claim 1, wherein the housing is a boom or a wing of the aerial vehicle.

3. The tilting system of claim 1, wherein the propeller lifts the aerial vehicle when being tilted upwards and cruises the aerial vehicle when being tilted downwards.

4. The tilting system of claim 1, wherein the propeller closes the opening portion of the housing when being tilted downwards.

5. The tilting system of claim 1, wherein the propeller opens the opening portion of the housing when being tilted upwards with respect to a longitudinal axis of the housing.

6. The tilting system of claim 5, wherein the propeller opens the opening portion of the housing when being tilted upwards and is disposed perpendicular to the longitudinal axis of the housing.

7. The tilting system of claim 1, wherein the link assembly is received in an interior of the housing when the propeller is tilted downwards, and is partially externally exposed through the opening portion when the propeller is tilted upwards.

8. The tilting system of claim 1,
wherein a first end portion of the upper link is pivotally connected to the propeller and a second end portion of the upper link is slidably coupled to the housing through the opening portion of the housing, wherein the at least a part of the lower link includes a first link, a first end portion of which is pivotally connected to the propeller, and a second link, and wherein a first end of the second link is pivotally connected to a second end portion of the first link and a second end portion of the second link is slidably engaged to the actuator through the opening portion of the housing.

9. The tilting system of claim 1, wherein the actuator moves the upper link and the lower link in a first predetermined direction in a longitudinal direction of the housing, the upper link and the lower link are moved forwards together to tilt up the propeller, the lower link continues to be moved forwards after the upper link is completely moved forwards, and the at least a part of the lower link is moved with respect to the hinge to lift the propeller to tilt up the propeller.

10. The tilting system of claim 1, wherein the actuator moves the upper link and the lower link in a second predetermined direction in a longitudinal direction of the housing, the propeller is tilted downwards, the lower link is moved rearwards into the housing, and the at least a part is arranged linearly as the upper link and the lower link are moved rearwards to tilt down the propeller.

11. The tilting system of claim 1, wherein a forward movement of the upper link is restricted by a stopper disposed in the housing at a maximum forward movement point, and the actuator is coupled to the lower link.

12. The tilting system of claim 1,
wherein the propeller closes the opening portion of the housing when being tilted downwards, and
wherein the propeller is rotated upwards while being moved forwards from the opening portion of the housing when being tilted upwards.

* * * * *